(12) United States Patent
Inoue et al.

(10) Patent No.: US 9,841,619 B2
(45) Date of Patent: Dec. 12, 2017

(54) OPTICAL BODY

(75) Inventors: Mitsuteru Inoue, Toyohashi (JP); Taichi Goto, Toyohashi (JP); Takashi Yamaguchi, Toyohashi (JP)

(73) Assignee: National University Corporation Toyohashi University of Technology (JP)

( * ) Notice: Subject to any disclaimer, the term of this patent is extended or adjusted under 35 U.S.C. 154(b) by 365 days.

(21) Appl. No.: 13/500,873

(22) PCT Filed: Oct. 4, 2010

(86) PCT No.: PCT/JP2010/067393
§ 371 (c)(1),
(2), (4) Date: May 17, 2012

(87) PCT Pub. No.: WO2011/043309
PCT Pub. Date: Apr. 14, 2011

(65) Prior Publication Data
US 2012/0218619 A1    Aug. 30, 2012

(30) Foreign Application Priority Data
Oct. 7, 2009 (JP) .................. 2009-233123

(51) Int. Cl.
*G02F 1/03* (2006.01)
*G02F 1/09* (2006.01)
*G02F 1/21* (2006.01)

(52) U.S. Cl.
CPC ............. *G02F 1/03* (2013.01); *G02F 1/0305* (2013.01); *G02F 1/09* (2013.01); *G02F 1/21* (2013.01);
(Continued)

(58) Field of Classification Search
CPC . G02F 1/03; G02F 1/015; G02F 1/315; G02F 1/07; G02F 1/09; G02F 1/29;
(Continued)

(56) References Cited

U.S. PATENT DOCUMENTS 3,392,353 A * 7/1968 Miller .................. H01S 3/1075
359/247
6,590,694 B2 * 7/2003 Matsushita et al. .......... 359/280
(Continued)

FOREIGN PATENT DOCUMENTS

| JP | 2001-091911 | 4/2001 |
|---|---|---|
| JP | 2002-311402 | 10/2002 |

(Continued)

OTHER PUBLICATIONS

International Search Report issued in PCT/JP2010/067393.
(Continued)

*Primary Examiner* — Jie Lei
(74) *Attorney, Agent, or Firm* — Gavin J. Milczarek-Desai; Yakov S. Sidorin; Quarles & Brady LLP

(57) ABSTRACT

Provided is an optical body capable of arbitrarily and quickly controlling the optical characteristics of incident light. A refractive index variable layer (8) formed of PLZT or other material and a magneto-optical material layer (9) formed of garnet or other material are provided side by side between a first reflective layer (3) and a second reflective layer (5). If linearly polarized light is made incident from the side of the first reflective layer (3), the incident light interacts with the magneto-optical material layer (9) and is converted into a right-circularly polarized light component and a left-circularly polarized light component. A very small retardation occurring between both the right- and left-circularly polarized light components is amplified through multiple reflections between the pair of reflective layers (3, (Continued)

5) and is controlled according to a controlled refractive index of the refractive index variable layer (8).

23 Claims, 10 Drawing Sheets

(52) U.S. Cl.
CPC .... *G02F 2001/213* (2013.01); *G02F 2203/15* (2013.01); *G02F 2203/50* (2013.01)

(58) Field of Classification Search
CPC . G02F 1/31; G02F 1/0315; G02F 1/21; G02F 2203/50; G02F 2201/213; G02F 2203/15; G02F 2001/213; H01L 31/115; H01L 27/14643; G02B 26/001; B82Y 20/00
USPC ........ 359/260, 261, 263, 245–248, 315–318, 359/258, 280, 281, 324; 372/26, 27, 372/29.016
See application file for complete search history.

(56) References Cited

U.S. PATENT DOCUMENTS

| | | | |
|---|---|---|---|
| 7,199,927 B2* | 4/2007 | Uehara | 359/579 |
| 2004/0008397 A1 | 1/2004 | Noonan | |
| 2010/0142046 A1* | 6/2010 | Gao | 359/484 |

FOREIGN PATENT DOCUMENTS

| | | |
|---|---|---|
| JP | 2004-517344 | 6/2004 |
| JP | 2006-201472 | 8/2006 |
| JP | 2009-109756 | 5/2009 |
| WO | 2006/077932 | 7/2006 |

OTHER PUBLICATIONS

Yamaguchi et al., "Fabrication of PLZT Thick Films Formed by Aerosol Deposition Method and Application for Electro-Optic Spatial Light Modulator," IEICE Technical Report, Jun. 12, 2009 (Jun. 12, 2009), vol. 109, No. 89, pp. 11-16 (see English translation of Abstract).

Kato et al., "Study on Light Reflection Layers for Magneto-Optic Spatial Light Modulator Driven by Piezoelectric Effect," IEICE Technical Report, Jun. 12, 2009 (Jun. 12, 2009), vol. 109, No. 89, pp. 17-21 (see English translation of Abstract).

European Search Report dated Jul. 21, 2015.

Stone, J. et al., "Enhancement of Faraday Rotation in a Fibre Fabry-Perot Cavity", Electronics Letters, IEE Stevenage, GB, vol. 26, No. 13, Jun. 21, 1990.

Qureshi, N., et al., "Cavity Enhancement of the Magneto-Optic Kerr Effect for Optical Studies of Magnetic Nanostructures", Applied Physics Letters, American Institute of Physics, US, vol. 85, No. 3, Jul. 19, 2004 (Jul. 19, 2004), pp. 431-433.

* cited by examiner

INCIDENT LIGHT →

← OUTPUT LIGHT 6 9 3 8 5

INCIDENT LIGHT →

← OUTPUT LIGHT 3 9 8 5

US 9,841,619 B2

OPTICAL BODY

TECHNICAL FIELD

The present invention relates to an improvement of an optical body.

BACKGROUND

An optical body that an optical functional layer interleaved between the first layer and the second layer is disclosed in the patent document 1. The optical functional layer is formed of electro-optical material including PLZT or other material which can control refractive index with applied voltage. Each of the first layer and the second layer is a reflective layer, so that the body composed of the first layer and the second layer constitutes a resonator. Light incident from the first layer is multiply-reflected between the first layer and the second layer. Then, the light is outputted from the first layer. Resonant wavelength of the resonator is controlled by changing refractive index of the optical functional layer. Accordingly, by controlling electric field applied to the optical functional layer, the refractive index of the optical functional layer is changed to make reflected quantity of incident light from the first layer controllable, namely light intensity outputted from the first layer controllable (as referred to FIG. 4 of the patent document).

RELATED PATENT DOCUMENT

Patent document 1: JP-A-2006-201472

SUMMARY OF THE INVENTION

Problems to be Solved by the Invention

In the optical body disclosed in the patent document 1, reflectivity of the incident light is controlled by controlling electric field applied to electro-optical material. Therefore, intensity of output light to incident light can be modulated.

In requests for modulating incident light, not only intensity modulation of the incident light but also phase modulation of the incident light and rotation angle modulation of the polarized plane of linearly polarized incident light have been studied.

However an optical body which can arbitrarily modulate the phase of the polarized light in a short time has not been proposed yet.

Further, also an optical body which can arbitrarily modulate the angle of the polarized plane of linearly polarized light in a short time has not been proposed yet.

For example, in an optical body that an optical functional layer formed of magnetic material producing Faraday effect is interleaved between a pair of reflective layers, when linearly polarized light is incident on the one reflective layer, angle of the polarized plane of the linearly polarized light is modulated according to magneto-optical effect of the optical functional layer. However, since modulated angle of the polarized plane depends on the effectiveness of magneto-optical effect of the optical functional layer, the modulated light is generally fixed, and the modulated angle is restricted within small value. On the other hand, by switching the direction of magnetic field applied to the optical functional layer, the magnetization direction of material constituting the optical functional layer can be changed to cause the change of the inclination angle of the polarized plane. However, it is difficult to change the direction of the magnetic field linearly.

Means for Solving the Problems

An object of the present invention is to solve at least one of the problems described above.

A first aspect of the present invention is defined as the following.

An optical body comprising:

a first layer and a second layer having a reflective layer; and an optical functional layer, for modulating a light incident from the first layer and outputting the light from the first layer, wherein the optical body includes a refractive index variable layer and a magneto-optical material layer as the optical functional layer; and the refractive index variable layer is positioned between the first layer and the second layer; and the magneto-optical material layer is positioned at a side of the refractive index variable layer oppositely to the second layer and produces Faraday effect.

According to the optical body defined above, the magneto-optical material layer and the refractive index material layer coexist in the one device. So, when linearly polarized light enters from the side of the first layer as incident light, the linearly polarized light is converted through interference with the magneto-optical material layer into elliptically polarized light ("right circularly polarized light" with right rotation and "left circularly polarized light" with left rotation). Between right circularly polarized light and left circularly polarized light, phase difference is produced. Such phase difference can be changed by controlling the phase difference of the refractive index variable layer.

In addition, as the optical functional layer, the refractive index material layer is positioned between the first layer and the second layer (a second aspect). Then, the right circularly polarized light and the left circularly polarized light are multiply-reflected between the first layer and the second layer to amplify the phase difference. Accordingly, even if the phase difference between the right circularly polarized light and the left circularly polarized light produced by the magneto-optical effect of the magneto-optical material layer is small, the phase difference produced in the light outputted from the first layer becomes significantly large. Thus, the light outputted from the first layer is reconverted from the right circularly polarized light and the left circularly polarized light into linearly polarized light, so that the angle of the polarized plane of the linearly polarized light rotates in accordance with the phase difference between right circularly polarized light and left circularly polarized light. Accordingly, the rotation angle of the polarized plane of the output light is modulated from the incident light.

Namely, by controlling the refractive index of the refractive index variable layer, the rotation angle modulation of the polarized plane of the output light can be controlled arbitrarily with a wide range.

More concretely, when incident light is linearly polarized light, the angle of the polarized plane of emitted light (linearly polarized light) can be modulated between −180 degree and +180 degree by controlling the refractive index of the refractive index variable layer on condition that the amplitude of the incident light is kept constant.

Similarly, when elliptically polarized light is incident on the optical body, the phase of the output light can be changed significantly. At this time, the output intensity of the output light can be maintained substantially constant.

EMBODIMENTS

Figure 1:
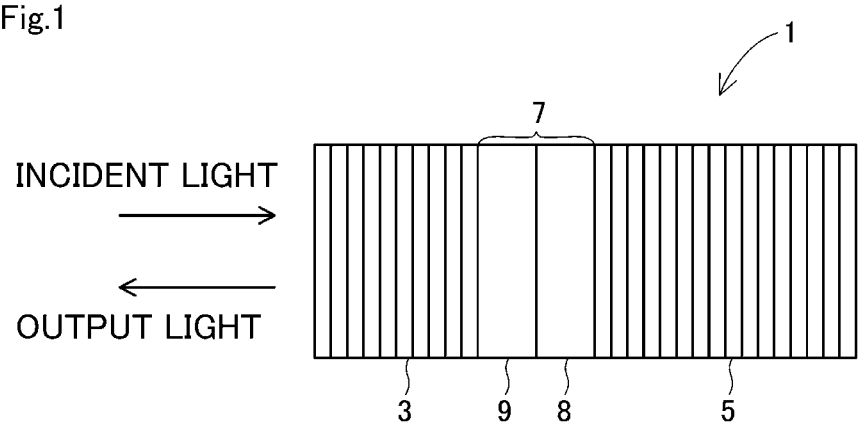
FIG. 1 is a schematic diagram showing the structure of an optical body of an embodiment of the present invention. In the following drawings, the elements producing the same effect are referred to with the same reference numerals and the description thereof is sometimes eliminated.

In the disclosure above, it is preferred that the first layer and the second layer are a reflective layer. It is because light is multiply-reflected between the first layer and the second layer to amplify modulated light.

It is preferred that the first layer for inputting and outputting light is a half mirror layer (the first reflective layer) and the second layer faced with the first layer is a total reflective layer (the second reflective layer). However, the second layer is not necessarily restricted to the total reflective layer.

The first reflective layer and the second reflective layer may be a metal layer or a dielectric multilayer film (Bragg mirror layer).

As the metal layer constituting the reflective layer, a single layer film or a multilayer film formed of aluminum, platinum, gold, silver or alloy thereof may be used.

In case that the Bragg mirror layer is used as the reflective layer, a kind of material and film thickness of a pair of dielectric layers which constitutes a repeated unit of dielectric multilayer film is arbitrarily selected according to wavelength of the incident light and usage of the incident light on condition that satisfies Bragg reflection condition ($d=\lambda/4$ with optical wavelength of each layer and film thickness d of each layer). Concretely, as the pair of dielectric layers, a combination of silicon oxide ($SiO_2$) and tantalum oxide ($Ta_2O_5$), silicon oxide ($SiO_2$) and silicon (Si), silicon oxide ($SiO_2$) and aluminum oxide ($Al_2O_3$) or other combination is used.

A repeated number of pairs of dielectric layers may be arbitrarily selected. However, when the same pair of dielectric layers is selected both in the first reflective layer and the second reflective layer, the repeated number of the second layer is set larger that that of the first layer. In case that a combination of silicon oxide ($SiO_2$) and tantalum oxide ($Ta_2O_5$) is selected, it is preferred that the repeated number of the pairs of the first layer is equal to 3 or more than 3, and the repeated number of the pairs of the second layer is equal to 5 or more than 5. Further, it is more preferred that the repeated number of the pairs of the first layer is equal to 5 or more than 5, and the repeated number of the pairs of the second layer is equal to 7 or more than 7.

The distance between the first layer and the second layer is $m \times \lambda/2$ with natural number m and optical wavelength $\lambda$ between the first layer and the second layer. Accordingly, the distance between the first layer and the second layer coincides with the width of the nodes of the wavelength.

Here, optical length is defined as $\lambda 0/n$. $\lambda 0$ is wavelength of incident light in vacuum, and n is effective refractive index. In case that only one kind of material layer is positioned between the first layer and the second layer, effective refractive index n is equal to the refractive index of the material layer. In case that plural material layers are positioned between the first layer and the second layer, the plural material layers consecutively stacked by different material layers may be assumed as one layer formed of one material, for calculating refractive index. Namely, effective refractive index of the plural layers may be equal to refractive index of such one material layer formed of one material. For example, in two consecutive layers, the one layer has refractive index n1 and film thickness d1 and the other layer has refractive index n2 and film thickness d2, effective refractive index of the two consecutive layers is $(n1 \times d1 + n2 \times d2)/(d1+d2)$ From a view of design easiness, in case that the plural layers are positioned between the first layer and the second layer, it is preferred that in the plural layers, thickness of each layer is integral multiple of wavelength/2 in each layer. For example, in case that the layer A and the layer B are positioned between the first layer and the second layer, thicknesses of the layer A and the layer B are made $m1 \times \lambda A/2$ and $m2 \times \lambda B/2$ respectively. Here, $\lambda A$ is optical wavelength of the layer A, and $\lambda B$ is optical wavelength of the layer B. According to such design, even in case that plural layers are positioned between the first layer and the second layer, the relation that the distance between the first layer and the second layer is $m \times \lambda/2$ with natural number m and optical wavelength λ between the first layer and the second layer is always maintained.

In case that a transparent electrode layer is positioned between the first layer and the second layer, it is preferred that the relation above is also maintained as to the transparent electrode layer.

In the disclosure above, when the distance between the first layer and the second layer is defined, optical wavelength λ is used to define thickness of each layer of the plural layers between the first layer and the second layer. Such optical wavelength λ may include a bit of margin, since it is very difficult to control exactly thickness of each layer in nm order. In addition, even if a bit of margin preferable within −10% and +10%, further more preferable within −5% and +5% is caused, modulation can be executed in accordance with the object.

As described above, it is preferred that the first layer and the second layer are a reflective layer. In case that at least one of the first layer and the second layer is formed of a dielectric multilayer (Bragg mirror layer), if a part or all of a dielectric layer constituting a multilayer is formed of a refractive index variable layer including optical magnetic material, magneto-optical material and so forth, such layers sometimes contribute to light modulation function.

When light goes through the refractive index variable layer, the refractive index of the refractive index variable layer is changed in the direction which passes the light through the refractive index variable layer.

The refractive index variable layer may occupy either the substantial all or the part of space between the first layer and the second layer.

Material for forming the refractive index variable layer includes electro-optical material, acousto-optic material, thermo-optical material or other material.

Electro-optical material changes the refractive index with applied electric field. Such electro-optical material includes PZT ($PbZr_{0.52}Ti_{0.48}O_3$), PLZT, PLHT, SBN, LT, LN, KDP, DKDP, BNN, KTN, BTO or other material.

In case that the refractive index variable layer is formed of electro-optical material, electric field applied to the refractive index variable layer can be controlled to change and control the refractive index of the refractive index variable layer. For applying electric field to the refractive index variable layer, transparent electrodes may be constituted to sandwich the refractive index variable layer, as disclosed in the Patent document 1. Of course, electric field may be applied from outside of the optical body. In such case, the direction for applying electric field is not restricted to the direction vertical to the plane of the refractive index variable layer but may be extended to the direction oblique to the plane of the refractive index variable layer.

Acousto-optic material changes the refractive index with applied stress and distortion. Such acousto-optic material includes PZT ($PbZr_{0.52}Ti_{0.48}O_3$), LT, LN, $Al_2O_3$, $Y_3Al_5O_{12}$, Si, $SiO_2$ or other material.

In case that the refractive index variable layer is formed of acousto-optic material, stress applied to the refractive index variable layer is controlled to change and control the refractive index of the refractive index variable layer. For applying stress to the refractive index variable layer, the refractive index variable layer may be sandwiched by transparent piezoelectric device.

Thermo-optical material changes the refractive index by temperature. Thermo-optical material is exemplified by liquid crystal.

In case that the refractive index variable layer is formed of thermo-optical material, heat added to the refractive index variable layer can be controlled to change and control refractive index of the refractive index variable layer. For controlling temperature of the refractive index variable layer, a heater may be provided, for example.

The refractive index variable layer may be formed of a single layer or plural layers. In case that the refractive index variable layer is formed of plural layers, each layer of the plural layers may be formed of the same material or different material.

Magneto-optical material produces magneto-optical effect (Faraday effect and Kerr effect). In magneto-optical material, linearly polarized light is converted through interference into right elliptically polarized light (right circularly polarized light) and left elliptically polarized light (left circularly polarized light). At this time, between right circularly polarized light and left circularly polarized light, phase difference is produced. In addition, since magnetic material has non-reciprocity, the right circularly polarized light and the left circularly polarized light having the phase difference each other is reconverted into linearly polarized light through interference in magneto-optical material to produce the rotation of the polarized plane of the linearly-polarized light (angular variation).

Magnetic material producing such magneto-optical effect includes ferromagnetic material, anti-ferromagnetic material, ferrimagnetic material or paramagnetic material.

Transparent ferromagnetic material producing Faraday effect includes material used for magnetic storage medium like CdCo, spinel ferrite like $CoFe_2O_4$, hexagonal ferrite like $PbFe_{12}O_{19}$, chalcogenide ferrite like $CdCr_2S_4$, chromium tri-halide like $CrCl_3$, garnet like $Y_3Fe_5O_{12}(BiY)_3Fe_5O_{12}$, manganese oxide like $(LaSr)MoO_3$, europium compound like EuO, a metal thin film formed of Fe and its alloy, a thin film formed of Co and its alloy, a thin film formed of Mn and its alloy, $Fe_2O_4$ or other material, or organic material including polyethylene or other material.

Transparent anti-ferromagnetic material producing magneto-optical effect includes manganese oxide or other material.

Paramagnetic material produces magneto-optical effect with magnetic field applied from outside.

Transparent paramagnetic material producing Faraday effect includes rare earth aluminum replaced garnet like $Tb_3AlO_{12}$, GGG ($Gd_3Ga_5O_{12}$) or other material, gas like oxygen gas or other gas material, liquid like water or other liquid material, solid like potassium chloride or other material, GGG ($Gd_3Ga_5O_{12}$), or glass like GGS crown glass or other glass material.

In modulating short wavelength light like blue light, it is preferred to use TAG or TGG, since TAG or TGG hardly absorbs short wavelength light.

The magnetic material layer may be formed of a single layer or plural layers. In case that the refractive index variable layer is formed of plural layers, each layer of the plural layers may be formed of the same material or different material.

In the present specification, "transmissivity" means the characteristic for transmitting incident light (modulated light). In other words, "transmissivity" is not limited to so-called transparency, namely not limited to transmissivity of visible light. In addition, the refractive index variable layer necessarily produces transmissivity.

Material producing Kerr effect includes garnet like $R_3Fe_5O_{12}$ (with rare earth element R, for example, Bi, Y, Sm, Eu, Gd, Tb, Dy, Ho, Er, Tm, Yb, or Lu), spinel ferrite like $MFe_2O_4$ (M=Mn, Fe, Co, Ni, Cu, Mg, or $Li_{0.5}Fe_{0.5}$), hexagonal crystal ferrite like $MFe_{12}O_{19}$ (M=Ba, Pb, Sr, Ca, $Ni_{0.5}Fe_{0.5}$, or $Ag_{0.5}La_{0.5}$), a poly-crystalline film formed of MnBi, PtCo, EuO, or PtMnSb, a rare earth-transition metal thin film formed of material like Gd—Co, Gd—Fe, Dy—Fe, Tb—Fe, Gd—Tb—Fe, Gd—Dy—Fe, Tb—Fe—Co, Gd—Tb—Fe—Co, (Gd—Fe)—Bi, (Gd—Fe)—Sn, or Nd—Dy—Fe—Co, or a composite film or other film formed of a thin film that is formed of the material described above.

When the magnetic material layer is made transparent, unitary stacked bodies of the magnetic material layer and the refractive index variable layer may be repeatedly stacked to form multilayer structure. In case that the multilayer structure is formed, it is preferred that each magnetic material layer is formed of the same material. However, each magnetic layer may be formed of different material. Similarly, it is preferred that each refractive index variable layer is formed of the same material. However, each refractive index variable layer may be formed of different material.

The optical body of the embodiments can arbitrarily control the rotation angle of the polarization plane of the linearly polarized light as described above. In addition, the optical body can arbitrarily control the phase of the elliptically polarized light. According to these features, the optical body works as a light modulating device.

Further, changed values in the rotation angle of the polarization plane of the linearly polarized light and the phase of the elliptically polarized light are significant (significantly large). So, the optical body can be used as an optical memory.

FIG. 1 is a schematic diagram showing the structure of the third aspect of an embodiment.

A first layer 3 is a half mirror layer, and a second layer 5 is a total reflection layer. Between the first layer 3 and the second layer 5 (sometimes referred to as a "cavity 7" in the present specification), a refractive index variable layer 8 and a magneto-optical material layer 9 are interleaved.

Thus, in an optical body 1 constituted as described above, the refractive index variable layer 8 and the magneto-optical material layer 9 are positioned between the first layer 3 and the second layer 5. So, when modulated light is multiply-reflected between both the first layer 3 and the second layer 5, the modulated light is influenced by both the refractive index variable layer 8 and the magneto-optical material layer 9 to improve modulation efficiency.

The magneto-optical layer 9 may be transparent (and producing Faraday effect) (as referred to the fourth aspect of the embodiment). In such a case, it is preferred that the magneto-optical effect layer 9 is positioned at the side of the refractive index layer 8 near to the first layer 3. When the incident and output light is linearly polarized, it becomes necessary to convert between linearly polarized light and elliptically polarized light in an interface between the optical body and the external side.

When material producing Kerr effect (particularly non-transparent) is used as the magneto-optical material, the magneto-optical material layer is positioned at the side of the second layer 5.

Figure 2:
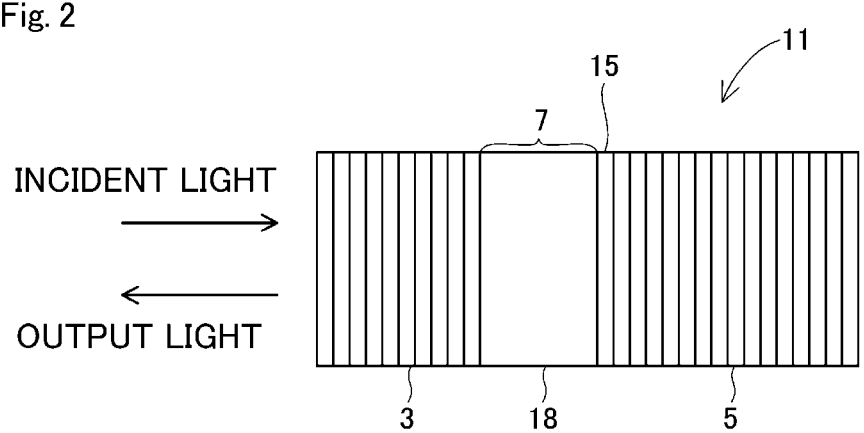
FIG. 2 is a schematic diagram showing a structure of an optical body of another embodiment.

FIG. 2 is a schematic diagram showing an optical body 11 of this example. The elements producing the same effects as those of FIG. 1 are referred to with the same reference numerals as those of FIG. 1 and the description thereof is eliminated.

A Kerr effect producing layer 15 described above is formed on the surface of the second reflective layer 5. If such a Kerr effect producing layer 15 produces reflection rate of significant value, preferably of substantial 100% by itself, the Kerr effect producing layer 15 can be used as the second reflective layer by itself.

The phase difference of the light converted by the Kerr effect producing layer 15 is amplified by the refractive index variable layer 18.

Figure 3:
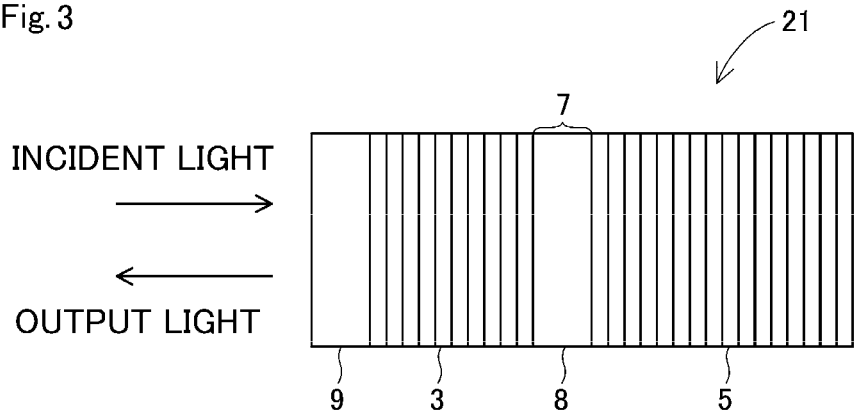
FIG. 3 is a schematic diagram showing a structure of an optical body of another embodiment.

FIG. 3 shows an optical body 21 of another embodiment. The elements producing the same effects as those of FIG. 1 are referred to with the same reference numerals as those of FIG. 1 and the description thereof is eliminated.

In the optical body 21, the magnetic material layer 9 is positioned outside of the cavity 7, namely at the incidence plane side of the first layer 3.

In the optical body 21 constituted as described above, when linearly polarized light is incident light, the linearly polarized light is converted into right circularly polarize light and left circularly polarized light between which a slight phase difference is caused, so that the slight phase difference of both the circularly polarized lights is amplified in the cavity 7.

An optical body that a first layer, a refractive index variable layer and a second layer are successively stacked on a bulk of a garnet substrate as a magnetic material layer 9 may be used.

Similarly, a bulk of a substrate of PLZT or other material may be used as a refractive index variable layer 8. Then, a first layer and a second layer are stacked on both the surfaces of the substrate. Further, a magneto-optical material layer 9 is stacked on the first layer.

Figure 4:
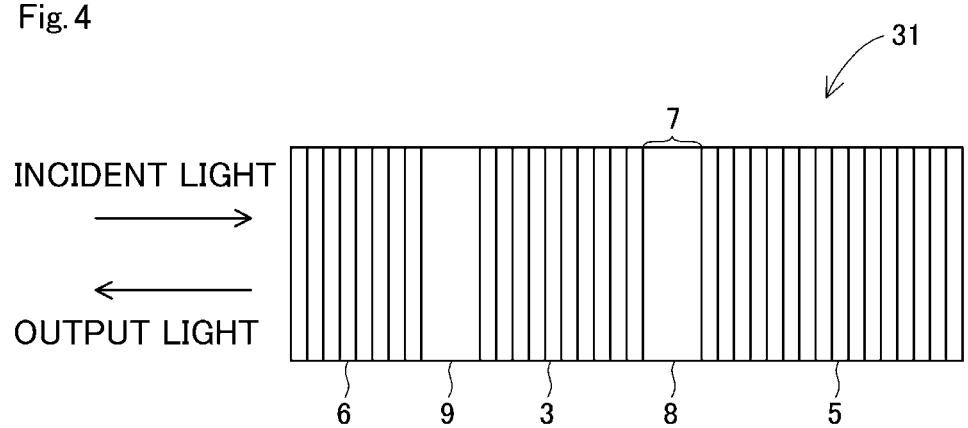
FIG. 4 is a schematic diagram showing a structure of an optical body of another embodiment.

FIG. 4 shows an optical body 31 of another embodiment. The elements producing the same effects as those of FIG. 3 are referred to with the same reference numerals as those of FIG. 3 and the description thereof is eliminated.

In the optical body 31, a third layer 6 is formed on the surface of the magneto-optical material layer 9. By constituting both the third layer 6 and the first layer 3 as reflective layers, modulated light is multiply-reflected between the third layer 6 and the first layer 3 to amplify the magneto-optical effect of the magneto-optical material layer 9.

Such the third layer 6 may be formed similarly to the third layer 3 and the second layer 5. It is preferred that the distance between the third layer 6 and the first layer 3 is defined as $m \times \lambda/2$. Here, m denotes a natural number and $\lambda$ denotes optical wavelength between the second layer 6 and the third layer 3.

Figure 5:
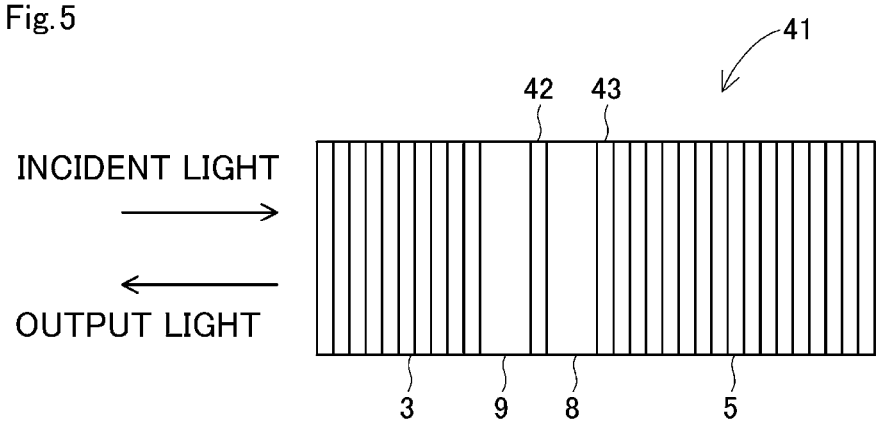
FIG. 5 is a schematic diagram showing a structure of an optical body of another embodiment.

FIG. 5 shows an optical body 41 of another embodiment. The same elements as those of FIG. 1 are referred to with the same reference numerals as those of FIG. 1 and the description thereof is partially eliminated.

In the optical body 41, a refractive index variable layer 8 is formed of magneto-optical material. The refractive index variable layer 8 is interleaved between a pair of transparent electrode layers 42, 43. By controlling voltage applied to the electrode layers 42, 43, electric field applied to the refractive index variable layer 8 is controlled to control the refractive index of the refractive index variable layer 8.

A voltage control circuit is provided for controlling voltage applied to the transparent electrode layers 42, 43 which are used as refractive index control means. Further, for simplifying the device constitution, it is preferred that the voltage control circuit is attached to the optical body 41 in one body.

The voltage control circuit may be formed with either the first reflective layer 3 or the second reflective layer 5, by general semiconductor integrated circuit technology.

Taking into consideration that the light is incident on the side of the first reflective layer 3, it is not preferred to provide the voltage control circuit at the side of the first reflective layer 3, since the incident light and the output light are shut out.

Accordingly, it is preferred to form the voltage control circuit on the surface of the second reflective layer 5.

Figure 6:
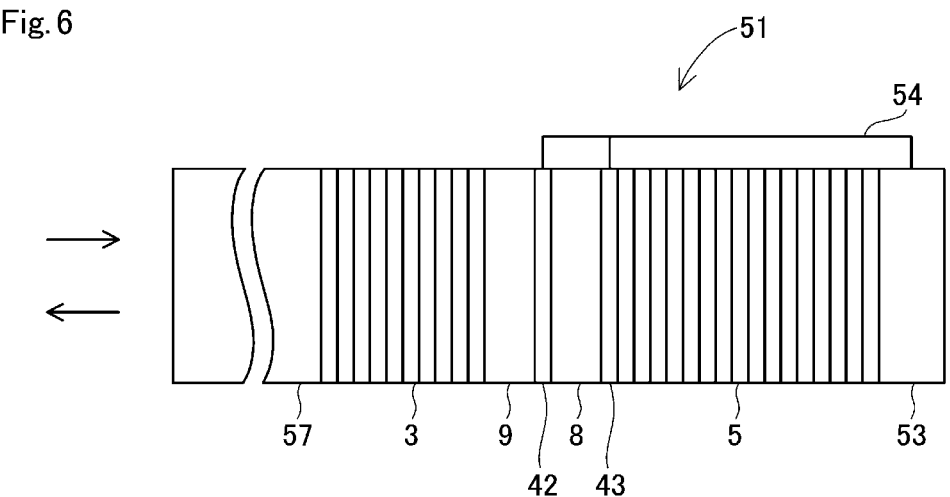
FIG. 6 is a schematic diagram showing a structure of a light modulating device of an embodiment.

FIG. 6 shows a light modulating device 51 comprising a semiconductor functional layer 53 which is equipped with a voltage control circuit. The elements producing the same effects as those of FIG. 5 are referred to with the same reference numerals as those of FIG. 5 and the description thereof is eliminated.

In FIG. 6, the reference numeral 54 denotes a power source line connected from the semiconductor functional layer 53 to transparent electrodes 42, 43. The semiconductor functional circuit 53 applies controlled voltage between the transparent electrodes 42, 43 through such a power source line 54.

The semiconductor functional layer 57 is formed in the side of a second layer 5. So, a substrate 57 is positioned in the side a first layer 3.

Such a substrate 57 may be formed of transparent material including $SiO_2$, SGGG ($Gd_{2.68}Ca_{0.32}Ga_{4.04}Mg_{0.32}Zr_{0.64}O_{12}$, for example) or other material.

Figure 7:
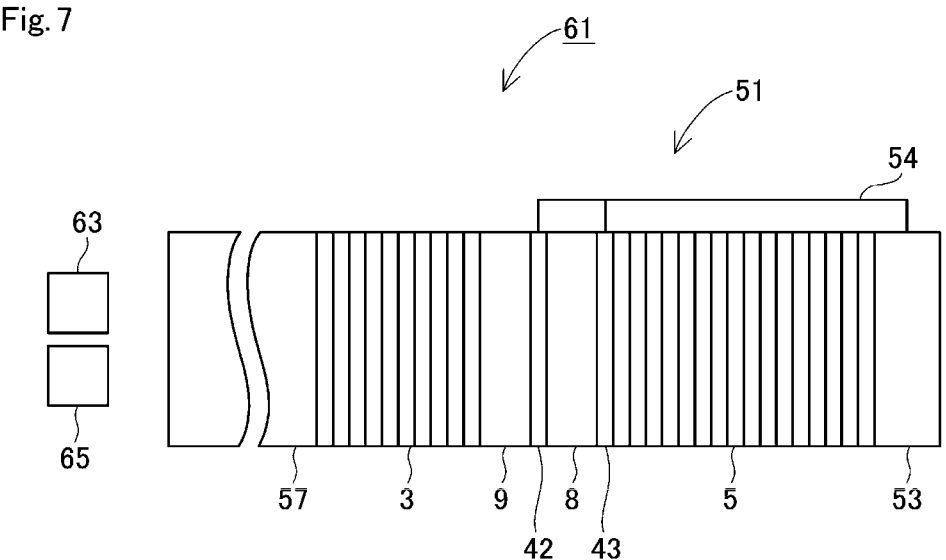
FIG. 7 is a schematic diagram showing a structure of a light modulating device of another embodiment.

In a light modulating system 61 shown in FIG. 7, a light incidence device 63 and an output light processing device 65 which are faced with the substrate 57 are applied to the light modulating device shown in FIG. 6.

The light incidence device 63 is constituted by a light source, an optical fiber, a polarization plate and so forth to make desired polarized light incident on the optical body.

The output light processing device 65 processes the output light of the optical body which has passed through the substrate 57. Interference between phase modulated output light and incident light may be used for an interferometer or other device.

EXAMPLES

The examples of the embodiments are described in the following.

Figure 8:
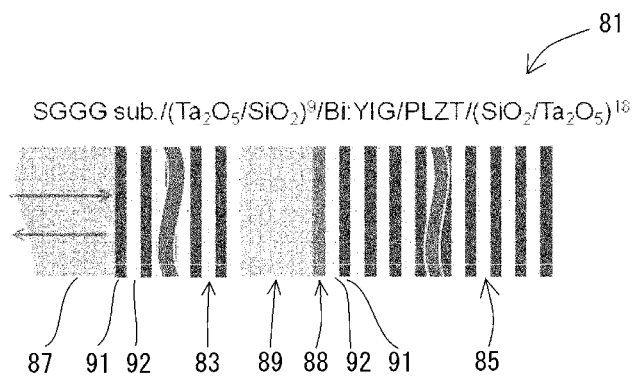
FIG. 8 is a schematic diagram showing a structure of an optical body of an example.

FIG. 8 shows the constitution of an optical body 81 of an example.

In the optical body 81 of the example, on a substrate 87 of SGGG ($Gd_{2.68}Ca_{0.32}Ga_{4.04}Mg_{0.32}Zr_{0.64}O_{12}$, for example) having thickness of 0.7 mm, a first reflective layer 93 having 9 unitary stacked pairs in total is stacked. In each unitary stacked pair, a tantalum oxide film having a thickness of 90 nm and a silicon oxide film having a thickness of 134 nm are stacked.

Further, a Bi:YIG layer ($Bi_1Y_2Fe_5O_{12}$) with a thickness of 712 nm and an optical wavelength $\lambda$ of 780 nm is stacked as an optical magnetic material layer 89. On the optical magnetic material layer 89, a PLZT layer (the concrete composition $Pb_{0.91}La_{0.09}Zr_{0.65}Ti_{0.35}O_3$) with thickness of 174 nm and optical wavelength $\lambda$ of 780 nm is stacked as a refractive index variable layer 88. By the way, since the PLZT layer 88 is formed of electro-optical material, transparent electrode layers made of ITO or other material are generally formed on the both planes of the PLZT layer 88. However, in this example, a pair of the t transparent electrodes is formed very thinly. So, the thicknesses of the transparent electrodes may be neglected. So, in FIG. 8, the transparent electrodes are not depicted. Incidentally, in the constitution of FIG. 8, the distance between the first layer 83 and the second layer 85 is five times larger than $\lambda/2$. The distance between the first layer 83 and the second layer 85 corresponds to the total thickness of the magneto-optical material layer 89 and the refractive index variable layer 88.

On the PLZT layer 88, a second reflective layer 85 is formed. The second reflective layer includes the same unitary stacked layer as the first reflective layer. For example, the second reflective layer has 18 unitary stacked layers.

Each layer is formed by sputtering method.

However, a method for forming each layer is not restricted to the sputtering method. Generally used thin film fabrication technique selected from evaporation method, ion plating method, spray method, ion beam irradiation method and so forth may be applied to the method for forming each layer.

Optical characteristic of the constitution of the optical body 81 shown in FIG. 8 is simulated by matrix approach method. Such simulation is referred to M. Inoue, T. Fujii, "A theoretical analysis of magneto-optical Faraday effect of YIG films with random multilayer structure", Appl. Phys. 81, 317 (1997).

Simulation results are shown in FIGS. 9-12.

Figure 9:
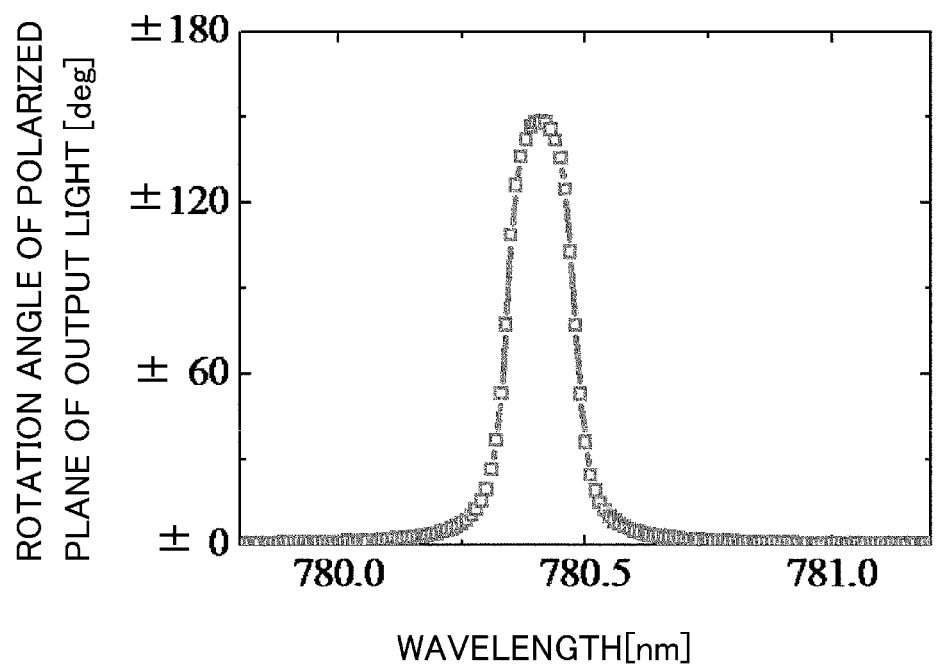
FIG. 9 is a graph showing an optical characteristic (wavelength—rotation angle) of an optical body of an example shown in FIG. 8.

In case that linearly polarized light with a wavelength of 780 nm (red) is incident on the optical body 81 of the example, the rotation angle of the polarization plane of output light which is the difference from the angle of the polarization plane of the incident light is shown in FIG. 9.

Figure 10A:
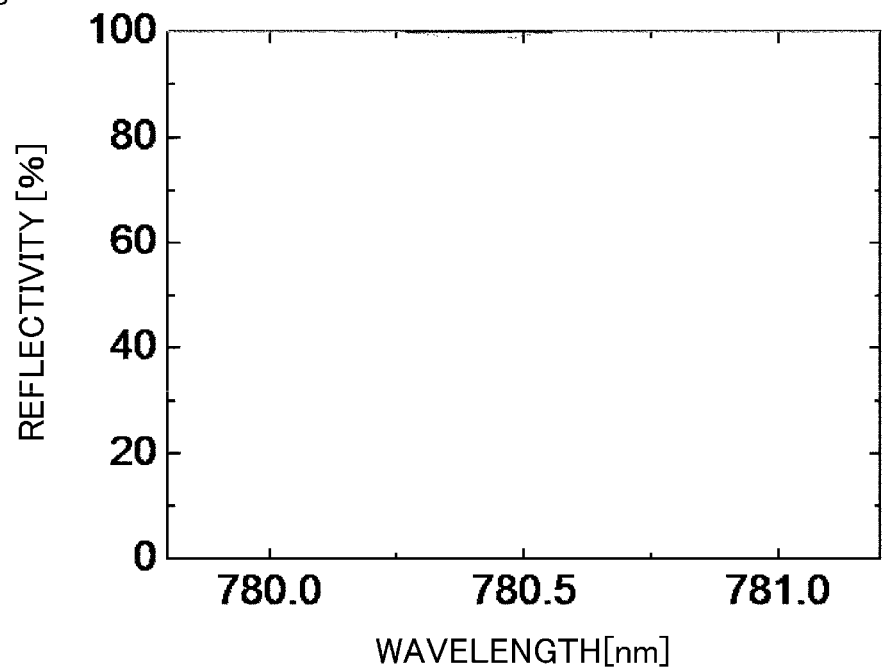
FIGS. 10A and 10B are a graph showing another optical characteristic (wavelength—reflectivity) of the optical body of the example shown in FIG. 8.

The reflectivity which is a ratio of the intensity of output light to the incident light is almost 100% as shown in FIG. 10A. Incidentally, FIG. 10B is a partially magnified view of FIG. 10A which partially magnifies around 780.4 nm.

Figure 10B:
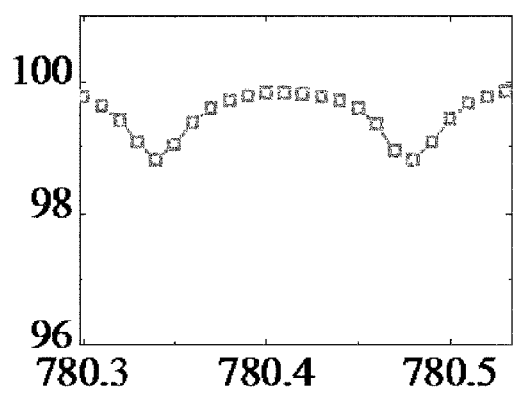

From results shown in FIGS. 9 and 10A-10B, it is understood that the polarization plane of the incident light can be changed with arbitrary angle according to the optical body 81 of the example by keeping the wavelength and the intensity.

Figure 11:
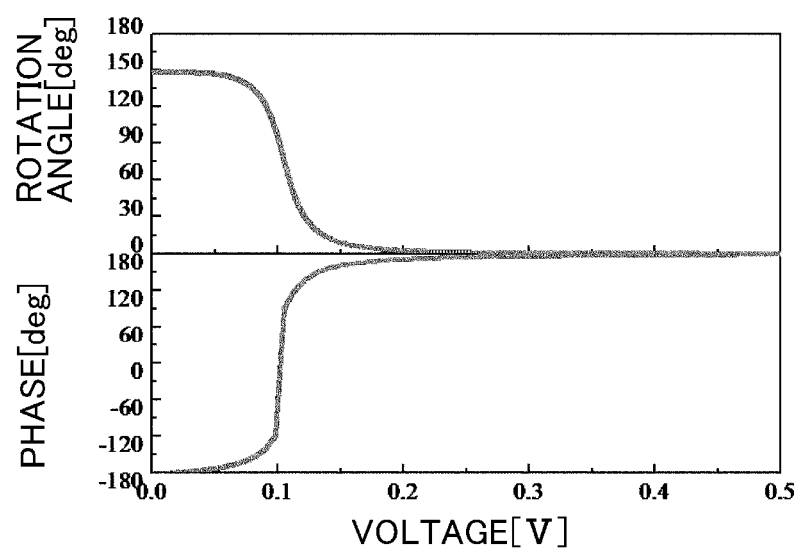
FIG. 11 is a graph showing another optical characteristics (voltage—rotation angle and voltage—phase) of the optical body of the example shown in FIG. 8.

FIG. 11 shows a relation among the rotation angle of the polarization plane of the output light (the difference from the angle of the polarization plane of the incident light), the phase of the output light (the difference from the phase of the incident light), and the voltage applied to the transparent electrode not depicted in the drawings. In simulation of the example, the transparent electrode is assumed to have no thickness and no electric conductivity. Material constituting the transparent electrode is assumed perfectly transparent.

In FIG. 11, it is understood that in the small voltage range between 0.0V and 0.2V, the rotation angle and the phase of the output light can be controlled. Incidentally, in the optical body of the example, since the angle change of the polarization plane synchronizes with the voltage change, substantial time delay is not caused between the angle change and the voltage change.

Figure 12A:
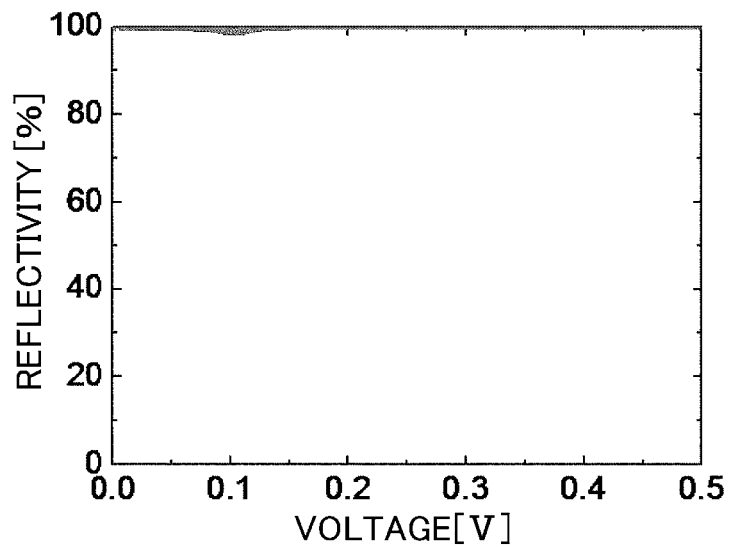
FIGS. 12A and 12B are a graph showing another optical characteristic (voltage—reflectivity) of the optical body of the example shown in FIG. 8.
Figure 12B:
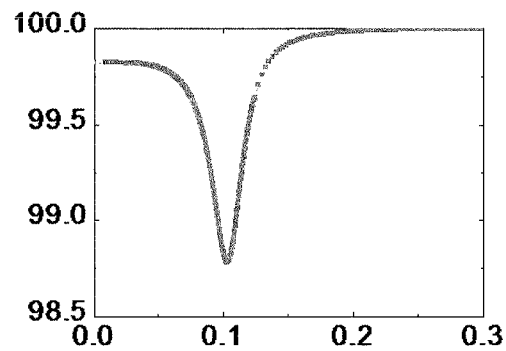

As to the relation between the applied voltage and the reflectivity (intensity of output light to intensity of input light) in FIG. 12A, in the applied voltage range between 0.0V and 0.2V, a state of almost perfect reflection can be kept. Incidentally, FIG. 12B is a partially magnified view of FIG. 12A which magnifies around 0.1V.

Figure 13:
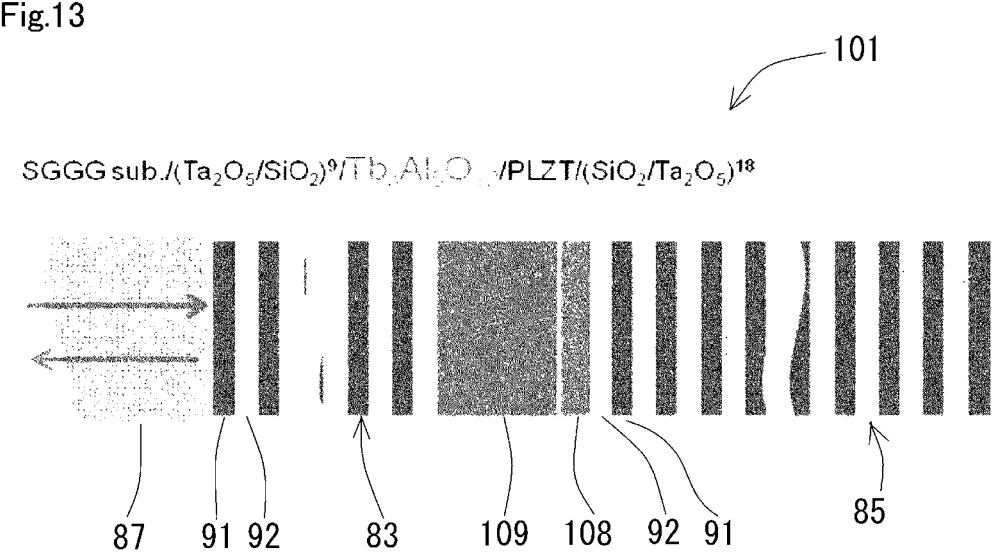
FIG. 13 is a schematic diagram showing a structure of an optical body of another example.

FIG. 13 shows an optical body 101 of another example. The same elements as those of FIG. 8 are referred to with the same reference numerals as those of FIG. 8 and the description thereof is eliminated.

In the example, TAG ($Tb_3Al_5O_{12}$) is used as a magneto-optical material layer 109. In the example, the magneto-optical material layer 109 formed of TAG has thickness of 840.71 nm, and the refractive index variable layer 108 formed of PLZT has thickness of 100.00 nm. So, the distance between the first layer 83 and the second layer 85 (corresponding to the total thickness of the magneto-optical material layer 109 and the refractive index variable layer 108) is nine times larger than $\lambda/2$.

By the way, since TAG is paramagnetic material, magnetic field is applied to the incidence direction of light from outside, namely the vertical direction to the surface of the film.

The characteristic of the optical body 101 shown in FIG. 13 was simulated similarly to the example above. The incident light is linearly polarized light having wavelength of 405 nm (blue). The simulation results are shown in FIGS. 14 and 15.

Figure 14:
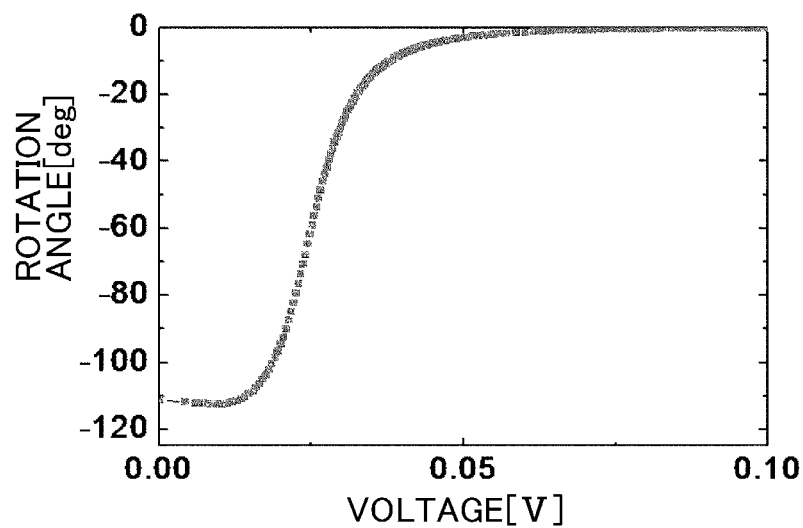
FIG. 14 is a graph showing an optical characteristic (voltage—rotation angle) of the optical body of the example shown in FIG. 13.

FIG. 14 shows a relation between the applied voltage and the rotation angle (the rotation angle difference between the polarized plane of the incident light and the polarized plane of the output light). FIG. 15 shows a relation between the applied voltage and the reflectivity (the intensity of the output light to the incident light).

Figure 15:
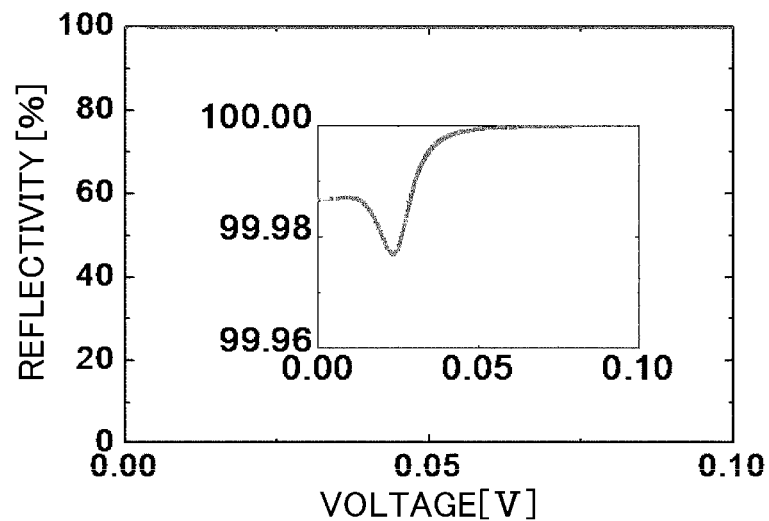
FIG. 15 is a graph showing another optical characteristic (voltage—reflectivity) of the optical body of the example shown in FIG. 13.

As shown in FIGS. 14 and 15, in the optical body, almost no loss is caused to maintain the reflectivity of almost 100% by using TAG as the magneto-optical material, even if short wavelength light is introduced into as the incident light. In addition, since the angle change of the polarization plane synchronizes with the voltage change, substantial time delay is not caused between the angle change and the voltage change.

Figure 16:
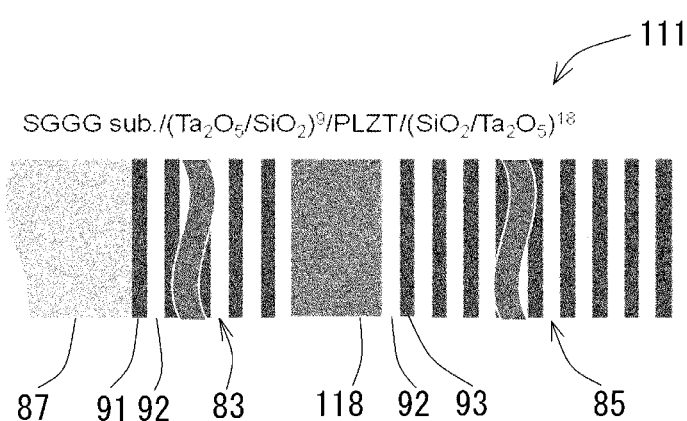
FIG. 16 is a schematic diagram showing a structure of an optical body of another example.

FIG. 16 shows an optical body 111 of another example. The same elements as those of FIG. 13 are referred to with the same reference numerals as those of FIG. 13 and the description thereof is partially eliminated.

In the optical body of the example, the magneto-optical material layer 89 is eliminated from the optical body 89 shown in FIG. 8. Incidentally, in the example shown in FIG. 16, for maintaining the relation that the distance between the first layer 83 and the second layer 85 is m×λ/2, a thickness of a refractive index variable layer 118 formed of PLZT is 4847 nm correspondingly to m=28. Here, m is a natural number and λ is wavelength.

The characteristic of the optical body 111 shown in FIG. 16 was also simulated similarly to the examples above. The incident light is linearly polarized light with wavelength of 780 nm (red). The simulation results are shown in FIGS. 17 and 18.

Figure 17:
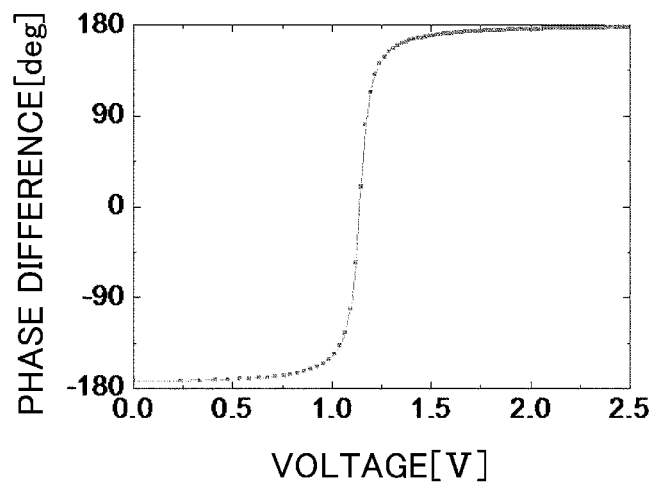
FIG. 17 is a graph showing an optical characteristic (voltage—phase difference) of the optical body of the example shown in FIG. 16.

FIG. 17 shows a relation between the applied voltage and the phase (the difference between the phase of the incident light and the phase of the output light). FIG. 18 shows a relation between the applied voltage and the reflectivity (the intensity of the output light to the incident light).

Figure 18:
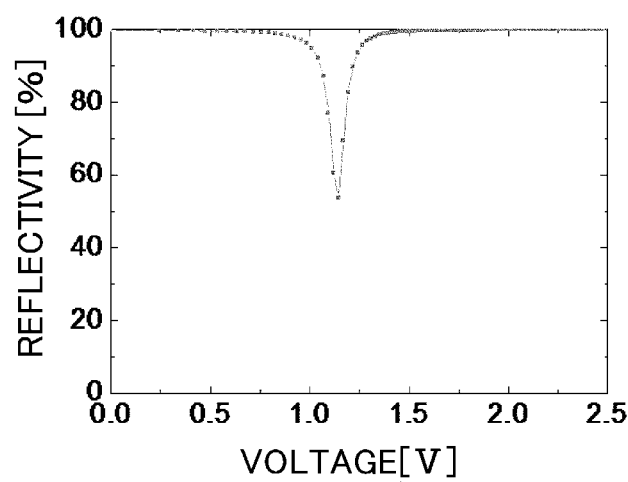
FIG. 18 is a graph showing another optical characteristic (voltage—reflectivity) of the optical body of the example shown in FIG. 16.

As shown in FIGS. 17 and 18, it is understood that in a small voltage range between 0.0V and 2.0V, phase can be controlled all over the angles between −180 degree and +180 degree. In addition, the reflectivity (the intensity of the output light to the incident light) almost more than 60% is kept. Further, since the phase change synchronizes with the voltage change, substantial time delay is not caused between the phase change and the voltage change.

The present invention is not limited to the illustrated embodiments or examples alone, but may be changed or modified within the scope easily devised by those skilled in the art without departing from the spirit of the present invention.

DESCRIPTION OF THE REFERENCE NUMERALS 1, 21, 41, 51, 61, 81, 101, 111 Optical body
3 Half mirror layer
5 Total reflection layer
7 Cavity
8, 18 Refractive index variable layer
9 Magneto-optical material layer
15 Kerr effect producing layer
42, 43 Transparent Electrode
53 Semiconductor functional layer
54 Power source line
57 Substrate
63 Light incident device
65 Output light processing device

The invention claimed is:

1. An optical body configured as a stack of film material layers in sequential contact with one another, comprising:
    a first layer and a second layer, said first and second layers being reflective layers;
    a refractive index variable layer positioned between the first layer and the second layer; and
    a magneto-optical material layer positioned at a side of the refractive index variable layer opposite the second layer and configured to produce a Faraday effect;
    wherein said optical body is configured
        to transform a first light, that has a first polarization and is incident from outside the optical body onto the first reflective layer towards the refractive index variable layer, into a second light that is polarized linearly or elliptically,
        wherein said first light has a first intensity and a first phase,
        wherein said second light has
            (i) a second intensity that is equal to the first intensity as a result of controlling a refractive index of the refractive index variable layer and a refractive index of the magneto-optical layer, and
            (ii) a second phase that is a modulated first phase, and
        to output said second light from inside the optical body through the first reflective layer, for both the first polarization that is linear and the first polarization that is elliptical.

2. An optical body according to claim 1,
    wherein the magneto-optical material layer is also positioned between the first layer and the second layer.

3. An optical body according to claim 1,
    wherein the magneto-optical material layer is positioned at an incidence side of the first layer.

4. An optical body according to claim 1, further comprising refractive index control means for controlling a refractive index of the refractive index variable layer.

5. An optical body according to claim 4,
    wherein the refractive index variable layer is formed of electro-optical material of which refractive index is changed by electric field; and
    the refractive index control means is configured to control an electric field applied to the refractive index variable layer.

6. An optical body according to claim 5,
    wherein the refractive index control means has a pair of transparent electrodes sandwiching the refractive index variable layer.

7. An optical body according to claim 1,
    wherein the magneto-optical material layer is formed of ferromagnetic material.

8. An optical body according to claim 1,
    wherein the magneto-optical material layer includes TAG (Terbium Aluminum Garnet) or TGG (Terbium Gallium Garnet).

9. An optical body according to claim 1,
wherein the magneto-optical material layer is immediately adjacent to the first layer, and the refractive index variable layer is immediately adjacent to the second layer, and
transparent electrode layers are positioned between the magnetic material layer and the refractive index variable layer and between the refractive index variable layer and the second layer, and the refractive index variable layer is formed of material of which refractive index is changed by electric field.

10. An optical body according to claim 9,
wherein the first layer is stacked on a surface of a transparent substrate.

11. A light modulating device comprising:
an optical body according to claim 10; and
a semiconductor functional layer stacked on the second layer and configured to control a potential applied to the transparent electrode layers.

12. A light modulating device according to claim 11,
wherein a light incidence unit and a radiated light processing unit faced with a substrate of the optical body are provided.

13. An optical body according to claim 1,
wherein said reflective layers, said material layers, and said transparent electrode layers are disposed to form a sequence in which
the MO material layer is immediately adjacent to the first reflective layer,
the first transparent electrode layer is immediately adjacent to the MO material layer;
the EO material layer is immediately adjacent to the first transparent electrode layer;
the second transparent electrode layer is immediately adjacent to the EO material layer, the second reflective layer is immediately adjacent to the second transparent electrode layer.

14. An optical body according to claim 13, further comprising a transparent substrate, the sequence formed on a surface of said transparent substrate with the first reflective layer being immediately adjacent to the surface.

15. A light modulating device comprising:
an optical body according to claim 14; and
a semiconductor functional layer stacked on the second layer, said functional layer configured to control said voltage.

16. A light modulating device according to claim 15, further comprising
a first device configured to deliver said incident light to the substrate, and
a light processing device configured to receive said output light from the substrate.

17. An optical body configured as a stack of film material layers in sequential contact with one another, having:
a first reflective layer and a second reflective layer—each of which is configured as a Bragg mirror;
a magneto-optical material layer configured to produce a Faraday effect; and
a refractive index variable layer of which refractive index is changeable with electric field, said refractive index variable layer sandwiched between a pair of transparent electrodes,
wherein a distance between the first reflective layer and the second reflective layer is m×λ/2 with natural number m and wavelength k;
wherein said magneto-optical material layer is positioned at a side of said refractive index variable layer opposite said second reflective layer, and said magneto-optical material layer and said refractive index variable layer are positioned between the first and second reflective layers,
wherein said optical body is configured
to transform a first light, that has a first polarization and is incident from outside the optical body onto the first reflective layer towards the refractive index variable layer, into a second light that is polarized linearly or elliptically,
wherein said first light has a first intensity and a first phase,
wherein said second light has
(i) a second intensity that is equal to the first intensity as a result of controlling a refractive index of the refractive index variable layer and a refractive index of the magneto-optical layer, and
(ii) a second phase that is a modulated first phase, and
to output said second light from inside the optical body through the first reflective layer, for both the first polarization that is linear and the first polarization that is elliptical.

18. A method for controlling an optical body configured as a stack of film material layers in sequential contact with one another and having
a first reflective layer and a second reflective layer each of which is configured as a Bragg mirror layer;
a refractive index variable layer, of which refractive index is changeable with an electric field,
a pair of transparent electrodes sandwiching the refractive index variable layer; and
a magneto-optical material layer positioned between the first reflective layer and second reflective layer, and further positioned between the first reflective layer and the refractive index variable layer;
wherein a distance between the first reflective layer and the second reflective layer is m×λ/2 with natural number m and wavelength λ;
the method comprising the steps of:
inputting linearly or elliptically polarized light into said optical body from the first reflective layer;
controlling voltage applied to the transparent electrodes; and
modulating phase of said linearly or elliptically polarized light with keeping intensity of said linearly or elliptically polarized light substantially constant;
wherein said optical body is configured to transform a first light, that has a first polarization and is incident from outside the optical body onto the first reflective layer towards the refractive index variable layer, into a second light that is polarized linearly or elliptically,
wherein said first light has a first intensity and a first phase, wherein said second light has
(i) a second intensity that is equal to the first intensity as a result of controlling a refractive index of the refractive index variable layer and a refractive index of the magneto-optical layer, and
(ii) a second phase that is a modulated first phase, and
to output said second light from inside the optical body through the first reflective layer, for both the first polarization that is linear and the first polarization that is elliptical.

19. An optical body configured as a stack of film material layers in sequential contact with one another, comprising:
a first reflective layer,
a second reflective layer, and a refractive index variable layer and a magneto-optical material layer configured to produce Faraday effect, said refractive index variable layer and said magneto-optical material layer disposed between said first and second reflective layers, wherein a distance between the first reflective layer and the second reflective layer is m×λ/2 with natural number m and wavelength λ;

wherein said optical body is configured to transform a first light, that has a first polarization and is incident from outside the optical body onto the first reflective layer towards the refractive index variable layer, into a second light that is polarized linearly or elliptically, wherein said first light has a first intensity and a first phase, wherein said second light has
  (i) a second intensity that is equal to the first intensity as a result of controlling a refractive index of the refractive index variable layer and a refractive index of the magneto-optical layer, and
  (ii) a second phase that is a modulated first phase, and to output said second light from inside the optical body through the first reflective layer, for both the first polarization that is linear and the first polarization that is elliptical.

20. An optical body configured as a stack of film material layers in sequential contact with one another, comprising:

first and second reflective layers disposed to form an optical resonator having an axis;

first and second transparent electrode layers disposed parallel to said first and second reflective layers; and a combination of a magneto-optical (MO) material layer and an electro-optical (EO) layers, disposed between said first and second reflective layers, such that the EO layer is located between the first and second transparent electrode layers;

said optical body configured to rotate a linear vector of polarization of input light, incident onto the optical resonator transversely to the first and second reflective layers, by any angle such that a linear vector of polarization of output light exiting the resonator after traversing the combination is controlled arbitrarily as a function of voltage applied between the first and second transparent electrode layers while maintaining a reflectance of said optical body above a level of 98.5 percent.

21. An optical body according to claim 20, wherein the MO material layer is positioned at an incidence side of a reflective layer on which the incident light impinges.

22. An optical body according to claim 20, wherein the MO material layer is formed of ferromagnetic material.

23. An optical body according to claim 20, wherein the MO material layer includes TAG (Terbium Aluminum Garnet) or TGG (Terbium Gallium Garnet).

* * * * *

UNITED STATES PATENT AND TRADEMARK OFFICE
CERTIFICATE OF CORRECTION

PATENT NO. : 9,841,619 B2
APPLICATION NO. : 13/500873
DATED : December 12, 2017
INVENTOR(S) : Mitsuteru Inoue et al.

Page 1 of 1

It is certified that error appears in the above-identified patent and that said Letters Patent is hereby corrected as shown below:

In the Claims

Column 13, Claim 17, Line 65, "wavelength k" should be -- wavelength $\lambda$ --.

Signed and Sealed this
Thirteenth Day of March, 2018

Andrei Iancu
*Director of the United States Patent and Trademark Office*